(12) United States Patent
Oya

(10) Patent No.: US 8,264,520 B2
(45) Date of Patent: Sep. 11, 2012

(54) COMMUNICATION SYSTEM, CONNECTION CONTROLLER, TERMINAL, AND CONTROL METHOD

(75) Inventor: Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 12/429,500

(22) Filed: Apr. 24, 2009

(65) Prior Publication Data

US 2009/0268009 A1    Oct. 29, 2009

(30) Foreign Application Priority Data

Apr. 28, 2008 (JP) ................................. 2008-117624

(51) Int. Cl.
*H04N 7/14* (2006.01)
(52) U.S. Cl. ................. 348/14.09; 348/14.08; 348/14.01
(58) Field of Classification Search .... 348/14.01–14.16; 709/204, 223; 715/756
See application file for complete search history.

(56) References Cited

U.S. PATENT DOCUMENTS

| 2007/0100908 A1* | 5/2007 | Jain et al. ...................... 707/204 |
| 2007/0188597 A1* | 8/2007 | Kenoyer .................... 348/14.08 |
| 2008/0235362 A1* | 9/2008 | Kjesbu et al. ................. 709/223 |

FOREIGN PATENT DOCUMENTS

| JP | 09-023414 | 1/1997 |
| JP | 2000-152206 | 5/2000 |

* cited by examiner

*Primary Examiner* — Melur Ramakrishnaiah
(74) *Attorney, Agent, or Firm* — Fitzpatrick, Cella, Harper & Scinto

(57) ABSTRACT

In a system including a plurality of terminals and a connection controller that controls connection among the respective terminals, the connection controller records terminals of a previous connection session and information on participants as session history information. In response to a request for a connection destination candidate from a terminal, the connection controller references the session history information and presents connection destination candidate terminals. The plurality of terminals transmits a connection request to the connection controller and receives a list of connection destination candidate terminals from the connection controller.

12 Claims, 10 Drawing Sheets

| CONFERENCE ID | TIME | POINT ID | PARTICIPANT ID |
|---|---|---|---|
| CONFERENCE 00101 | STARTING TIME | POINT A (TERMINAL 110) | PERSON 0001, PERSON 0003, PERSON 0005 |
| | ENDING TIME | POINT B (TERMINAL 120) | PERSON 0010, PERSON 0021, PERSON 0104 |
| ... | | ... | ... |

COMMUNICATION SYSTEM, CONNECTION CONTROLLER, TERMINAL, AND CONTROL METHOD

BACKGROUND OF THE INVENTION

1. Field of the Invention

The present invention relates to an inter-terminal connection control technique for videoconferencing and the like.

2. Description of the Related Art

Videoconferencing systems that perform two-way audiovisual communication using a network have been commercialized. Initiating a videoconference requires calling upon participating terminals to interconnect. Control for such interconnection is referred to as connection control.

Commercially available videoconferencing systems are implemented with a function for performing connection control in conformity with a recommendation such as H.323, and guarantee interconnectivity between different manufacturers or models. Connection control is normally carried out by a function module referred to as an MC (Multipoint Controller) which manages connection. An MC may be mounted on a connection control server or on a conference terminal.

In addition, IP phones are also widely used as a method of one-to-one audiovisual communication. Connection control for establishing a call with an IP phone is carried out in conformity with, for example, SIP (Session Initiation Protocol). With an IP phone, an SIP server performs the role of the connection control server in a videoconferencing system.

One-to-one videoconferencing or IP phones involve registering a facial image to an address book.

Furthermore, Japanese Patent Laid-Open No. 09-023414 discloses a connecting user interface in which a facial image is assigned to each camera and a camera image is displayed by dragging and dropping on an on-screen facial image icon to a display frame.

In addition, an example in which a facial image is applied to connection control is disclosed in Japanese Patent Laid-Open No. 2000-152206. By arranging a videoconferencing connection control server so as to consider a conference-participating terminal to be an object of connection control only when a facial image is detected in a video image, a facial image is always displayed on the conference-participating terminal.

Moreover, facial recognition techniques exist in which a degree of similarity between a verification facial image and a registered facial image is measured with respect to a geometric model representing the positional relationship of facial features corresponding to, for example, the eyes or the mouth.

Unlike an IP phone, in a videoconferencing system, a terminal is usually used by a plurality of users. In addition, a conference terminal is normally shared. However, connection control in conventional art is carried out based on the concept of connecting between conference terminals. As such, connection history is limited to terminal-based history.

Furthermore, while attempts have been made to call up history information by logging into a videoconferencing terminal, there may be cases where a reservation is not made in the first place. As a result, connection initiation at individual videoconferencing terminals require that cumbersome operations be performed involving either tracing back a fair amount of history or searching for network information on another party's conference terminal.

SUMMARY OF THE INVENTION

The present invention provides a system which is able to present a list of connection destination terminal candidates from information on a plurality of would-be participants and from past history information.

According to an aspect of the present invention, there is provided a communication system comprised of a plurality of terminals and a connection controller that controls connection among the respective terminals, wherein the connection controller comprises: a recording unit that records terminals of a previous connection session and information on participants as session history information; and a presenting unit that presents, in response to a request for a connection destination candidate from a terminal, connection destination candidate terminals to the terminal having made the request for a connection destination candidate by referencing session history information corresponding to information on participants desiring communication from the recording unit, each of the plurality of terminals comprises: a transmitting unit that transmits a connection request and participant information to the connection controller; and a receiving unit that receives a list of the connection destination candidate terminals from the connection controller.

According to another aspect of the present invention, there is provided a connection controller that controls connection among a plurality of terminals, comprising: a recording unit that records terminals of a previous connection session and information on participants as session history information; and a presenting unit that presents, in response to a request for a connection destination candidate from a terminal, connection destination candidate terminals by referencing session history information corresponding to information on participants desiring communication from the recording unit.

According to another aspect of the present invention, there is provided a terminal comprising: a recording unit that records terminals of a previous connection session and information on participants as session history information; and a presenting unit that references session history information corresponding to participant information from the recording unit and presents connection destination candidate terminals.

According to another aspect of the present invention, there is provided a control method for a communication system comprised of a plurality of terminals and a connection controller that controls connection among the respective terminals, comprising: at the connection controller, recording terminals of a previous connection session and information on participants as session history information in a recording unit; and presenting, in response to a request for a connection destination candidate from a terminal, connection destination candidate terminals by referencing session history information corresponding to information on participants desiring communication from the recording unit, and at the terminal having made the request for a connection destination candidate, transmitting a connection request and participant information to the connection controller; and receiving a list of the connection destination candidate terminals from the connection controller.

According to another aspect of the present invention, there is provided a control method for a terminal that connects to a plurality of other terminals, comprising: recording terminals of a previous connection session and information on participants as session history information in a recording unit; and presenting, in response to a request for a connection destination candidate from a terminal, connection destination candidate terminals by referencing session history information corresponding to information on participants desiring communication from the recording unit.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the drawings.

First Embodiment

As a first embodiment, a connection controller will be described which returns a list of connection destination candidates based on past connection history and conference participant history when information on a hopeful videoconferencing participant is transmitted to a connection control server.

Figures 1, 2:
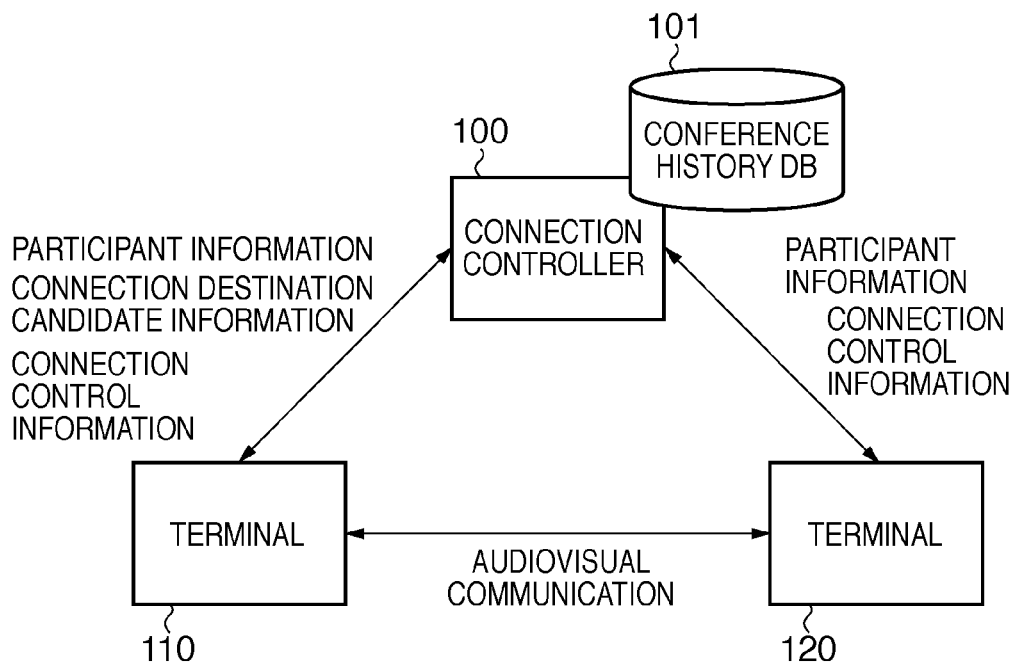
FIG. 1 is a diagram showing an example of a configuration of a videoconferencing system.
FIG. 2 is a diagram showing an example of a configuration of a conference history DB 101.

FIG. 1 is a diagram showing an example of a configuration of a videoconferencing system. As shown in FIG. 1, the videoconferencing system includes a terminal 110, a terminal 120, and a connection controller 100 having a conference history DB 101. It should be noted that while the videoconferencing system shown in FIG. 1 has two terminals, the present invention is not limited thereto and is applicable to cases where a larger number of terminals exist in a videoconferencing system.

The terminal 110 and the terminal 120 are conference terminals respectively having a camera, a microphone, a speaker, a display, and the like. In addition, the terminal 110 and the terminal 120 support functions of, for example, H.323—a recommendation for realizing videoconferencing over the Internet.

The connection controller 100 is a multipoint connection controller that performs multipoint connection control and audiovisual relay, and supports the functions of H.323 in the same manner as the terminals 110 and 120.

In addition, the connection controller 100 including the conference history DB 101 performs pre-registration of conference participants, confirms would-be participants, presents connection destination candidates to the terminals 110 and 120, and performs connection control on the same. In this case, pre-registration of conference participants refers to processing for registering, in advance, members who wish to participate in the conference. When a registration request accompanied by an arbitrary ID and a password is made from the terminals 110 and 120, the connection controller 100 registers a conference participant. Confirmation of would-be participants is processing for confirming members who wish to participate in the conference. A would-be participant inputs a pre-registered ID and password via the terminals 110 and 120. Inputting may either be performed by inputting a person number ID into a conference terminal using a remote controller or by using a contact-less IC card.

The connection controller 100 verifies would-be participant information with the conference history DB 101 to extract a conference to which a plurality of would-be participants had previously connected, and determines a terminal to become a connection destination candidate. Details on the conference history DB 101 and a search method will be described later.

A conference terminal performs initial registration of a member, entry of a willing conference participant, acquisition, display and selection of a connection destination list, and audiovisual communication with other terminals. A user operates a terminal via an input device such as a remote controller and a GUI (Graphical User Interface) on a display. In the first embodiment, capability information such as video and audio formats, a communication scheme, a port number, and the like are exchanged between the terminal 110 and the terminal 120 to initiate audiovisual communication.

Moreover, as for a connection control communication protocol, for example, H.225, which is recommended as a part of the H.323 recommendation, can be used. In addition, for example, G.711 and G.722 are usable as the audio format, H.261 and H.263 are usable as the video format, and RTP/RTSP are usable as the transfer protocol. Incidentally, RTP is an acronym for Real Time Transport Protocol while RTSP is an acronym for Real Time Streaming Protocol. Moreover, while audiovisual communication is directly performed between the terminal 110 and the terminal 120, audiovisual communication can instead be performed via the connection controller 100 without incident.

Figure 11:
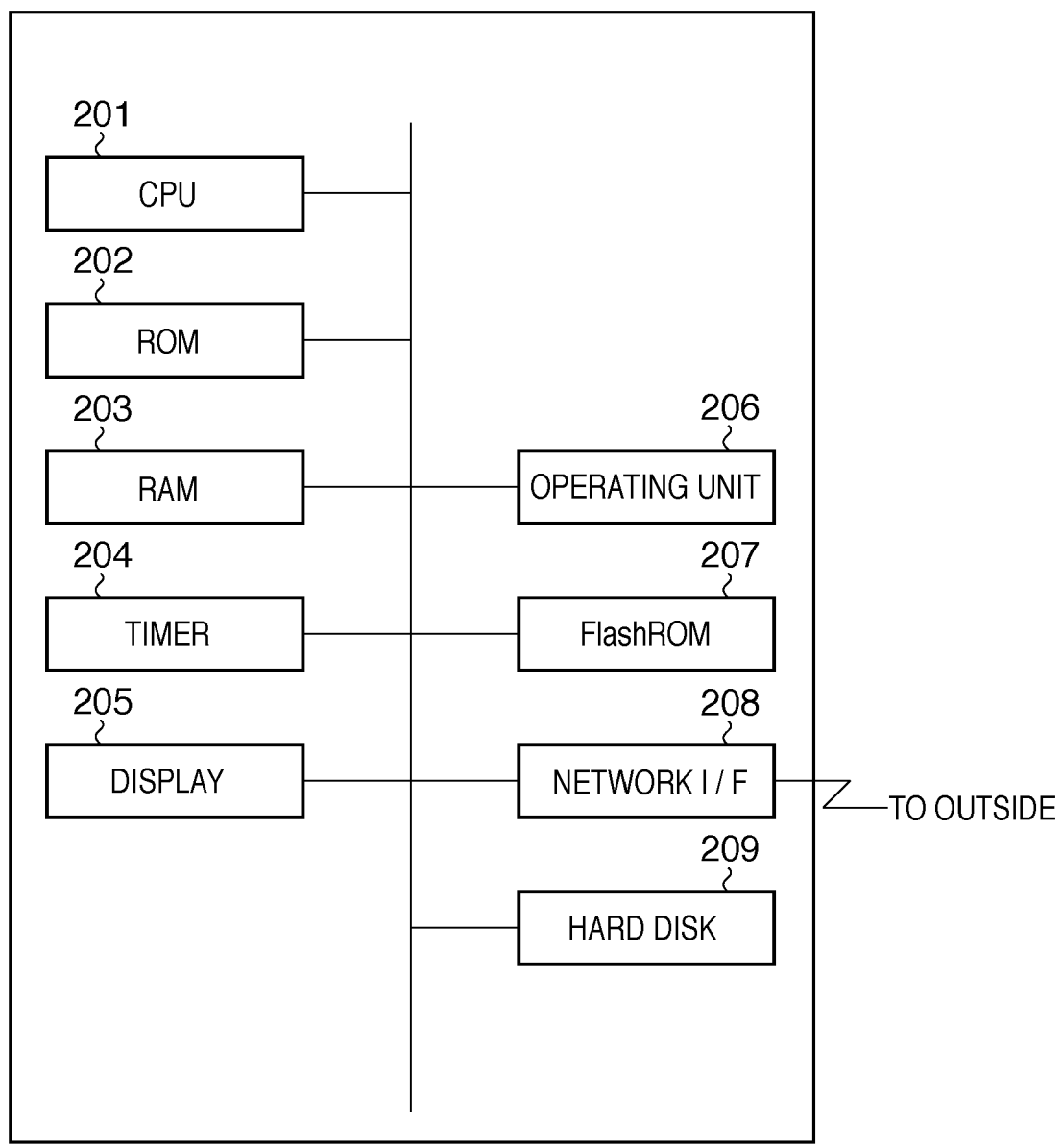
FIG. 11 is a diagram showing an example of a hardware configuration of a terminal and a connection controller.

FIG. 11 is a diagram showing an example of a hardware configuration of a terminal and a connection controller. In this case, the terminal and the connection controller will be described as being information processors (personal computers).

In FIG. 11, the information processor includes a CPU 201, a ROM 202, a RAM 203, a timer 204, a display 205, an operating unit 206, a Flash ROM 207, a network I/F 208, and an HD 209.

The CPU (central processing unit) 201 controls the entire information processor. The ROM 202 stores various programs and the like. The RAM 203 stores a currently running program and, at the same time, temporarily stores data and the like used by the currently running program.

The timer 204 measures various times. The display 205 displays a user interface. The operating unit 206 is made up of, for example, a keyboard, mouse, a touch display, or the like, and is used to input information. The Flash ROM 207 stores various configuration data files the like. The network I/F 208 connects the information processor to an external device. The HD 209 stores various programs and configuration data files.

The CPU 201 is constituted by a micro-processor. The functions or processing according to the flowchart to be described later are realized when the CPU 201 reads and executes a program stored in the ROM 202 or the HD 209 onto the RAM 203.

Now, a method of obtaining a connection destination candidate from would-be participant information of the connection controller 100 will be described using FIG. 2. First, a description will be given on the conference history DB 101 that records information regarding communication terminals and participants in previous connection sessions as session history information.

FIG. 2 is a diagram showing an example of a configuration of the conference history DB 101. Recorded in the conference history DB 101 are, for each previous conference session, times (starting time, ending time), point IDs (connection terminal information), and participant IDs (participant information at each terminal). As for recording formats, terminal information is recorded as point IDs and participant information as participant IDs.

While participant IDs must be registered and issued in advance and require a separate procedure from the conference connection control, since the present invention is not dependent on any registration method, a description thereof will be omitted. In addition, while the example shown in FIG. 2 involves two conference terminals in a two-point connection, it is obvious that the participation of a larger number of terminals is actually possible.

Next, a method of determining a connection candidate terminal from would-be participant information will be described. First, would-be participant information is verified against conference participant IDs in previous connection sessions to search for terminals with high degrees of coincidence. The requesting terminal is also included in this search. Next, connected terminals of the same conference as the searched terminal are listed. Subsequently, in a descending order of the number of connections, the terminals are sorted and ranked in a reverse chronological order of the time and date of connection initiation. Finally, together with the ranking information, the terminals are returned to the requesting terminal.

Next, a terminal connection initiation procedure in the videoconferencing system shown in FIG. 1 will be described using the sequence diagram shown in FIG. 3.

Figure 3:
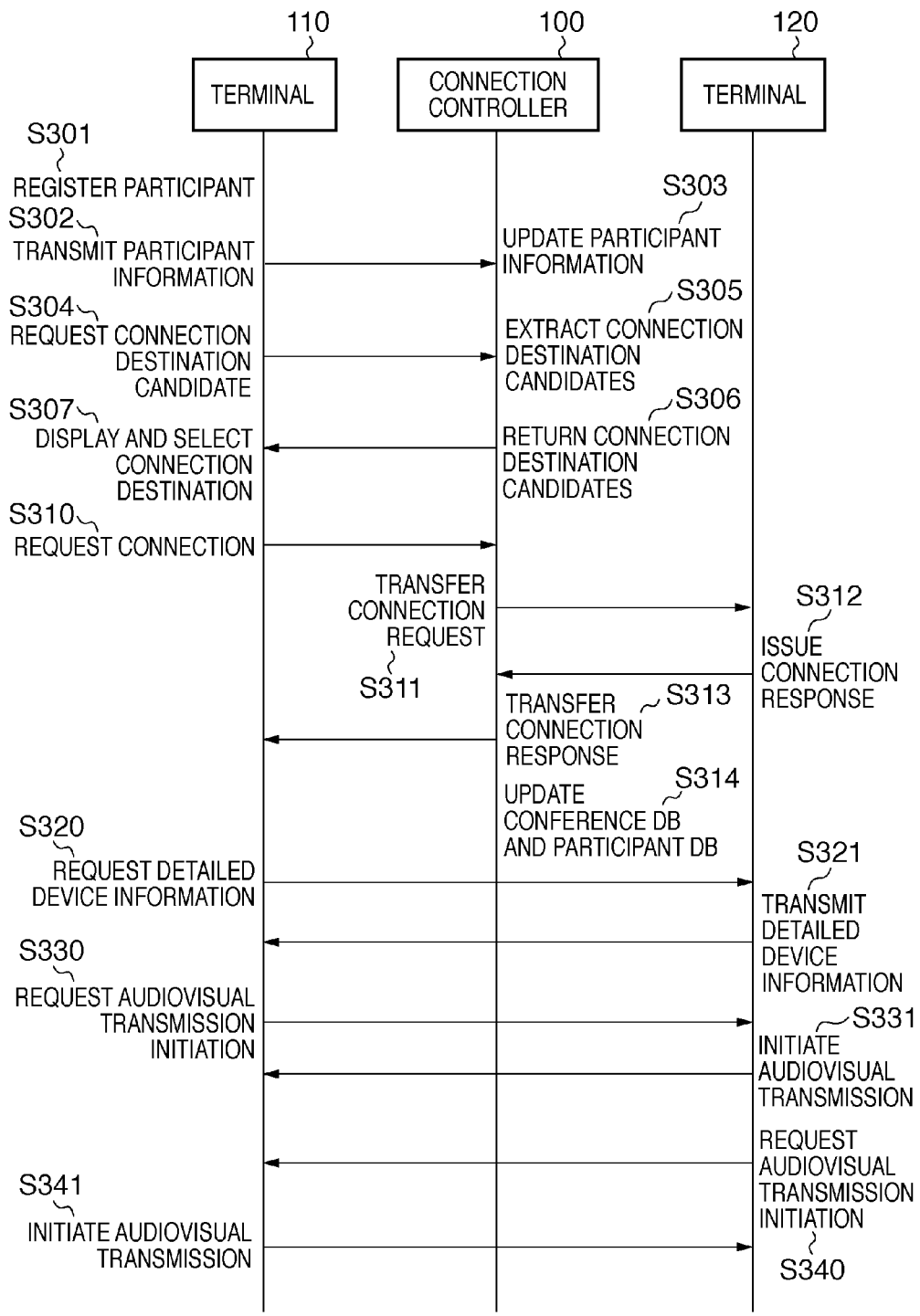
FIG. 3 is a diagram showing a terminal connection initiation procedure in a videoconferencing system according to a first embodiment.

FIG. 3 is a diagram showing a terminal connection initiation procedure in the videoconferencing system according to the first embodiment. First, in S301, participant registration is performed at the terminal 110. While registration methods include those using a dedicated login screen or a contact-less IC card, since the present invention is not dependent on any registration method, a description thereof will be omitted. Next, in S302, would-be participant information is transmitted from the terminal 110 to the connection controller 100. In S303, the connection controller 100 registers would-be participant information received from the terminal 110. The registration of would-be participant information to the connection controller 100 may be performed a plurality of times.

Once registration of the would-be participant information is completed, in S304, the terminal 110 makes a connection destination candidate request to the connection controller 100. In response thereto, in S305, the connection controller 100 extracts connection destination candidates, and returns the connection destination candidates in S306.

Meanwhile, the terminal 110 displays a list of the connection destination candidates in S307, whereby the user selects and inputs a connection destination.

Next, S310 to S313 constitute connection control processing via the connection controller 100. First, in S310, the terminal 110 requests connection with the terminal 120 via the connection controller 100. Accordingly, in S311, the connection controller 100 transfers a connection request to the terminal 120. The terminal 120 determines whether connection is to be permitted or not, and in S312, responds to the connection controller 100. Subsequently, in S313, the connection controller 100 returns a response to the connection request to the terminal 110. In this case, it is assumed that connection has been permitted.

While the protocol during connection control is described by H.255 or SIP (Session Initiation Protocol), since both protocols are standard, a description thereof will be omitted.

Subsequently, in S314, upon conference initiation, the connection controller 100 updates the conference history DB 101 and the participant ID. At this point, the would-be participant of the terminal 110 officially becomes a participant.

Next, detailed device information is exchanged between the terminal 110 and the terminal 120, and two-way audiovisual communication is carried out. While an example in which an exchange is directly performed between terminals has been described above, audiovisual communication can also be carried out via the connection controller 100.

In S320 and S321, detailed device information is exchanged between the terminals. In other words, in S320, the terminal 110 transmits detailed information on itself to the terminal 120 and, at the same time, requests detailed information on the terminal 120. In response to the request, in S321, the terminal 120 returns detailed device information. In this case, examples of detailed device information include video and/or audio encoding methods, a transfer protocol, a display screen size, and the like. Finally, in steps S330, S331, S340 and S341, video and audio are mutually requested to initiate communication.

Figure 4:
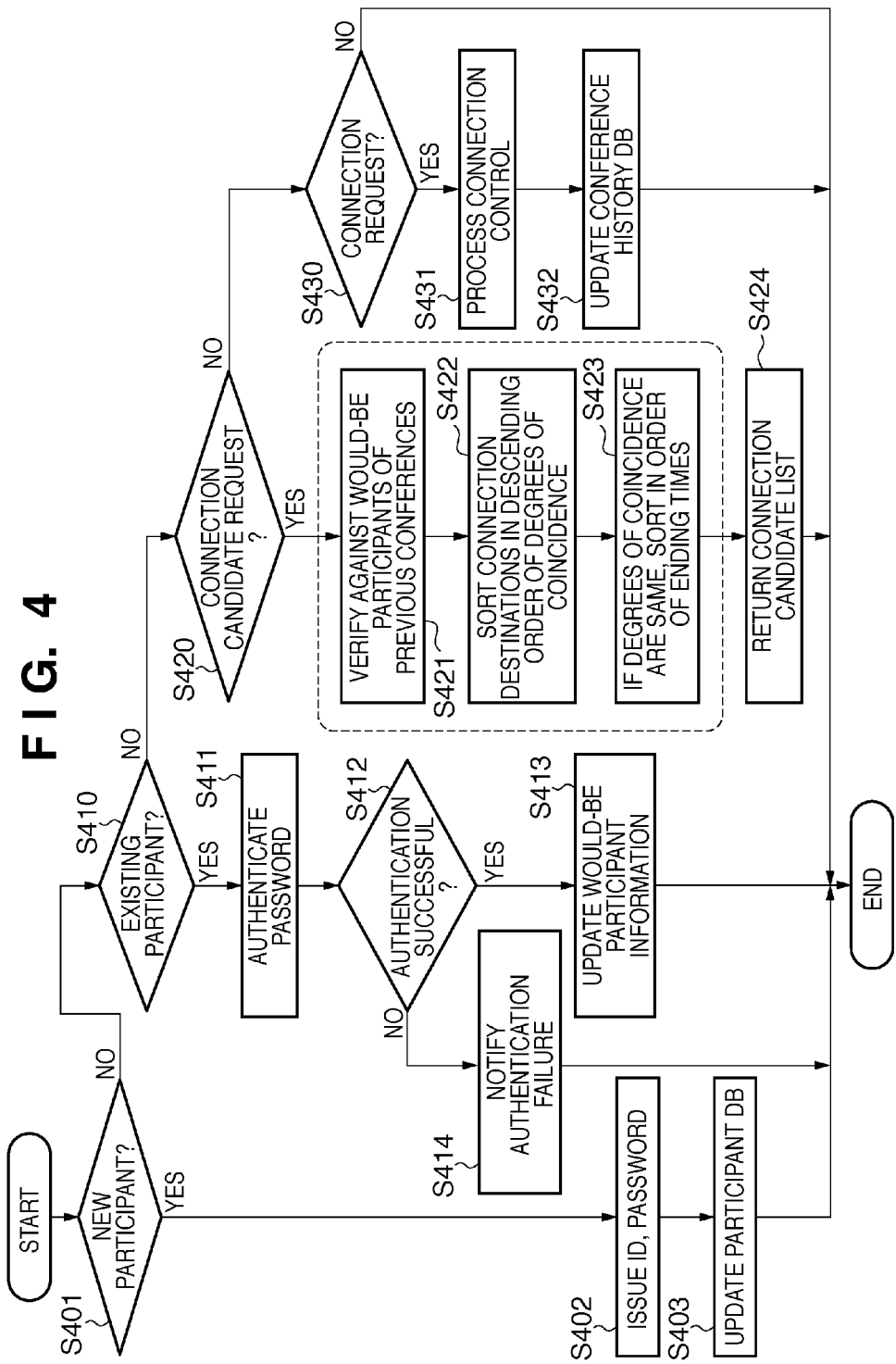
FIG. 4 is a flowchart showing processing performed by a connection controller according to the first embodiment.

Next, processing regarding connection control performed by the connection controller 100 will be described using FIG. 4. FIG. 4 is a flowchart showing processing performed by the connection controller according to the first embodiment. In the flowchart, only event processing regarding member management such as an initial registration of a member and connection control are shown.

First, in S401, a judgment is made on whether an event is a new member registration request event or not. As a result of the judgment, in the case of a new member registration request event, processing proceeds to S402 to issue an ID and a password, and in S403, the participant DB is updated. At this point, the password may be specified by the member to be initially registered himself/herself.

Meanwhile, when S401 results in NO, processing proceeds to S410 to judge whether the request is a conference participation request by an existing member or not. As a result of the judgment, in the case of a conference participation request by an existing member, processing proceeds to S411 to confirm an ID and a password. Next, in S412, a judgment is made on whether authentication is successful or not. If successful, processing proceeds to S413 to update would-be participant information. If unsuccessful, processing proceeds to S414 to issue an authentication failure notification to the terminal.

In addition, when S410 results in NO, processing proceeds to S420 to judge whether the request is for a connection candidate list or not. As a result of the judgment, in the case of a connection candidate list, processing proceeds to S421 to verify the would-be participant against previous conference participants. In S422, a conference with a high degree of coincidence therebetween is extracted, whereby terminals other than the requesting terminal having participated in the extracted conference are listed up as connection destination candidate terminals. Subsequently, in S423, when degrees of coincidence are the same, sorting is performed in the order of ending times. Ending times are normally sorted in reverse chronological order. Moreover, sorting may be performed in a descending order of the number of connections instead of an order of ending times. The selection of connection destination candidates is completed in this manner, and in S424, a connection candidate list is returned to the terminal. At the terminal, the received candidate list of connection destination terminals is presented on the display.

On the other hand, when S420 results in NO, processing proceeds to S430 to judge whether the request is a connection request for holding a conference. When it is judged that the request is not a connection request, the processing is terminated. However, in the case of a connection request, the processing proceeds to S431 to perform connection control processing, and in S432, the conference history DB 101 is updated.

The updated contents include starting and ending times of a conference, connected terminals, participating members and the like shown in FIG. 2. The connection control corresponds to S310 to S313 shown in FIG. 3.

According to the first embodiment, information on connecting terminals and participants of a previous conference session can be retained in a connection controller as a conference history DB, and a terminal candidate with a high connectability can be selected by verifying such information against would-be participants. Consequently, the user of a conference terminal is able to simplify specification of a connection destination terminal.

Second Embodiment

Hereinafter, a second embodiment of the present invention will be described in detail with reference to the drawings. In the second embodiment, would-be participants are registered and connection destination candidate lists are created at all terminals connected to the network.

The configuration of a videoconferencing system according to the second embodiment is similar to that of the first embodiment shown in FIG. 1, and a description thereof will be omitted. In addition, while two conference terminals are arranged in a two-point connection, it is obvious that the participation of a larger number of terminals is actually possible.

Figure 5:
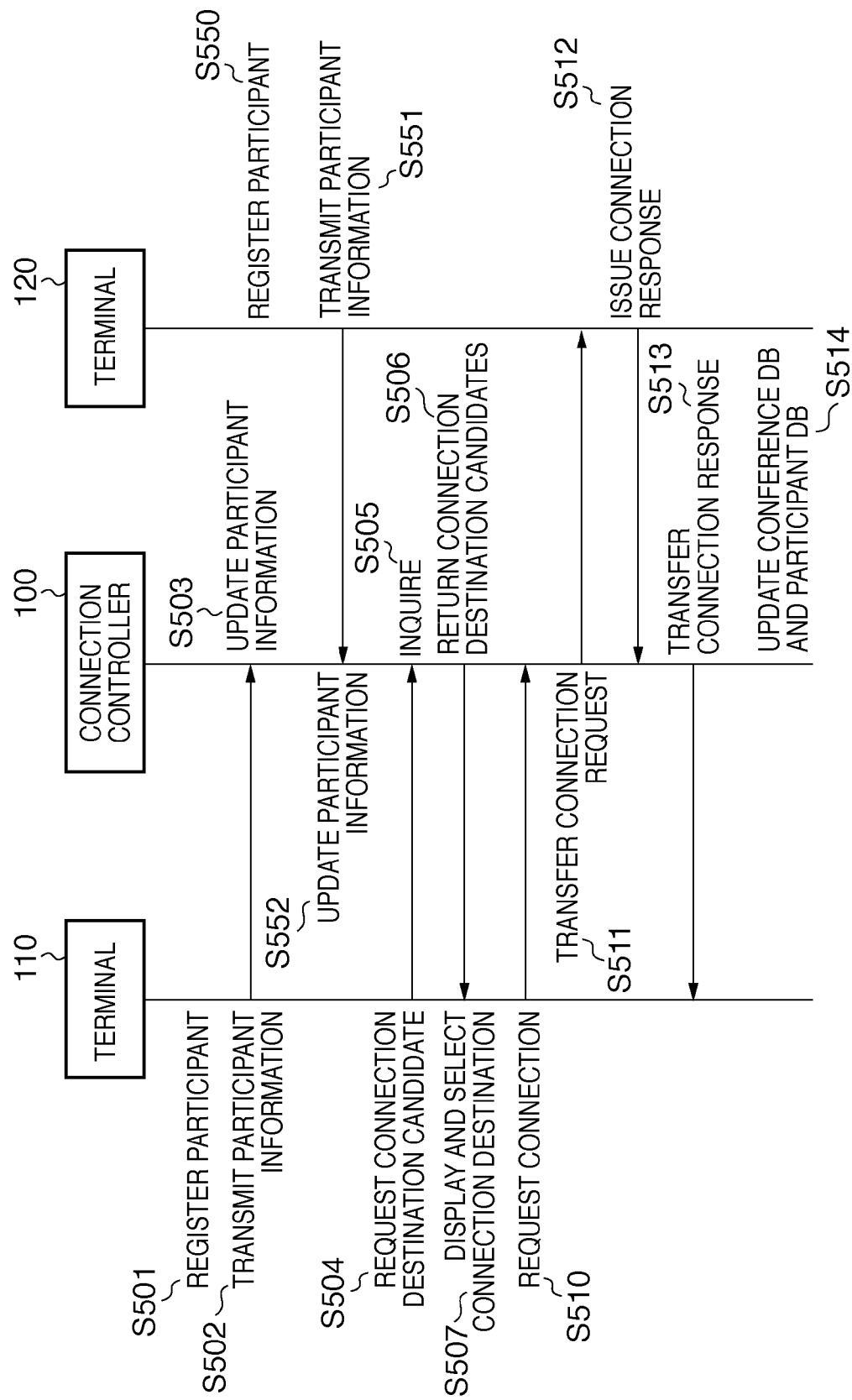
FIG. 5 is a diagram showing a terminal connection initiation procedure in a videoconferencing system according to a second embodiment.

FIG. 5 is a diagram showing a terminal connection initiation procedure in the videoconferencing system according to the second embodiment. The following description will focus on parts that differ from the first embodiment.

First, in S501 to S503, would-be participants are registered with a terminal 110 and would-be participant information is transmitted to and registered with a connection controller 100. This processing is the same as that performed in S301 to S303 described in the first embodiment and shown in FIG. 3. In addition, in S550 to S552, would-be participants are registered with a terminal 120 and would-be participant information is transmitted to and registered with the connection controller 100.

Next, in S504, a request for a connection destination candidate list is made from the terminal 110 to the connection controller 100. Accordingly, in S505, the connection controller 100 makes an inquiry to a conference history DB 101, and in S506, a candidate list of optimal connection destinations is returned. Here, what is different from the first embodiment is that since the connection controller 100 retains would-be participant information of not only the terminal that had requested the connection destination candidate list but of all terminals, verification can be performed more precisely.

To be specific, a conference session including a large number of current would-be participants is searched from conferences in which the terminal 110 had previously participated. Subsequently, a list of terminals currently connected to the network among the terminals having participated in the searched conference session is returned as connection destination candidate terminals. Sorting by the number of connections or by conference starting/ending times can be performed in the same manner as in the first embodiment. In S507 and S510 to S514, the same processing as S307 and S310 to S314 in FIG. 3 is performed.

According to the second embodiment, using would-be participant information at each terminal, a list of terminals with high connectability can be sent to a terminal requesting that a conference be held. Consequently, operations relating to connection initiation in videoconferencing can be simplified.

Third Embodiment

Next, a third embodiment of the present invention will be described in detail with reference to the drawings. In the third embodiment, the connection controller 100 described in the first and second embodiments further includes a face DB, while the terminals 110 and 120 further include face detection modules capable of extracting a facial feature amount. In addition, by transmitting a facial feature extracted at a terminal to the connection controller 100 to perform verification, participants desiring to participate in a conference are automatically registered. Accordingly, the trouble of having to log in manually can be eliminated.

Figure 6:
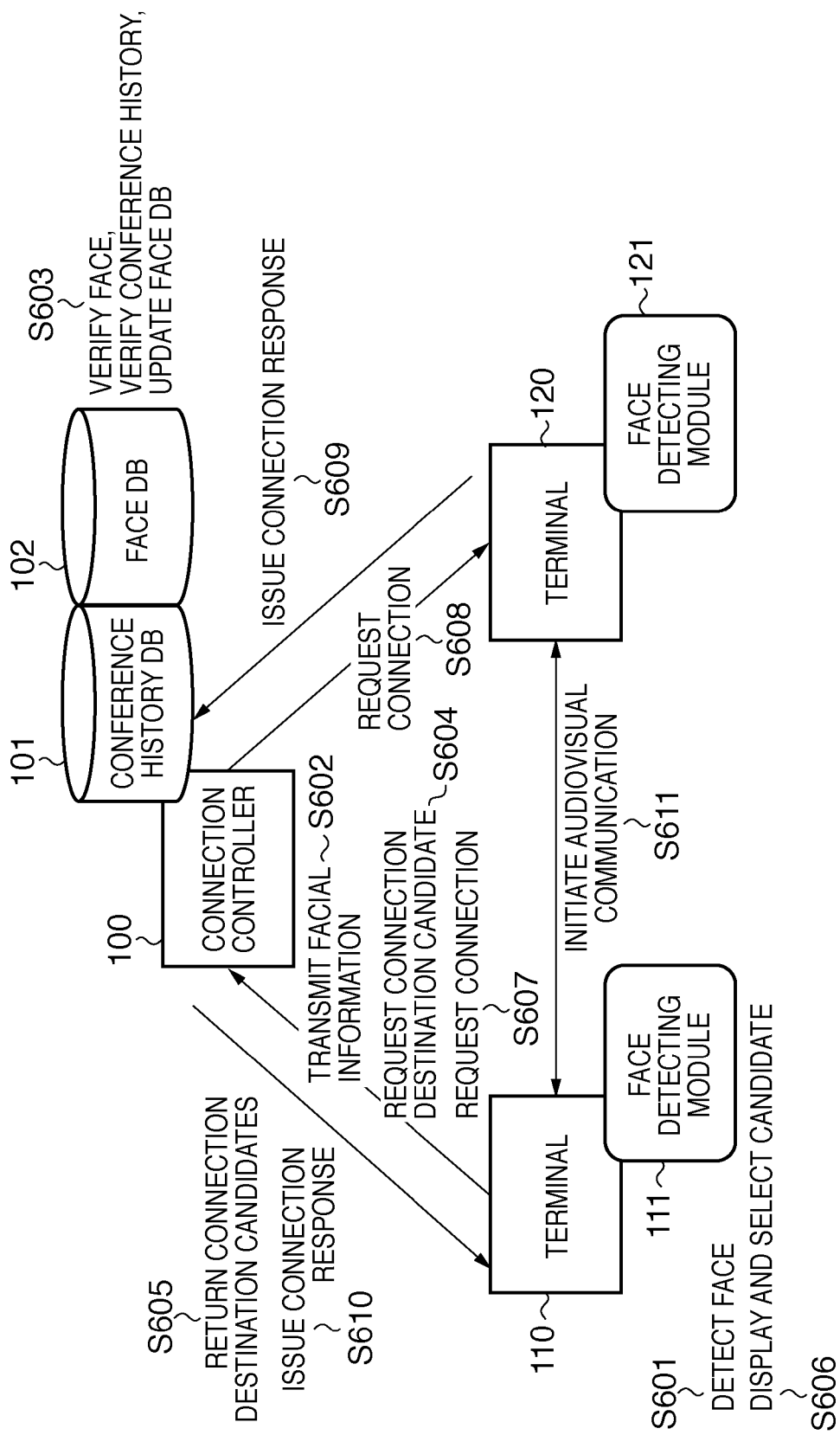
FIG. 6 is a diagram showing a configuration of a videoconferencing system according to a third embodiment.

FIG. 6 is a diagram showing a configuration of a videoconferencing system according to the third embodiment. Similar to the configuration shown in FIG. 1, the system includes one connection controller 100 and two terminals 110 and 120. It is needless to say the number of terminals is not restrictive.

The terminal 110 includes a face detecting module 111 and extracts a facial feature from an image acquired from a camera, not shown, connected to the terminal 110, and transmits the same to the connection controller 100. It is assumed that, similar to the terminal 110, the terminal 120 also includes a face detecting module 121.

The connection controller 100 includes the face DB 102 in addition to the conference history DB 101. Similar to the first and second embodiments, the conference history DB 101 retains information such as conference IDs, starting and ending times, terminal IDs, participant IDs, and the like. The face DB 102 retains facial feature quantities for performing facial image verification in correspondence to participant IDs. Feature quantities and their description methods differ according to the facial verification methods used. Facial features include edge characteristics of specific portions such as both ends of the eyes, the pupil, both ends of the lips, and the geometrical distances between such edge characteristics. However, since the present invention is not dependent on any specific facial verification method, a detailed description thereof will be omitted.

In the third embodiment, processing will be described in which a terminal extracts a facial feature and transmits the same to the connection controller, whereby the connection controller performs verification. However, alternatively, the terminal may simply extract a facial image, whereby the connection controller extracts a facial feature amount from the facial image.

In addition, it is needless to say that a facial feature can be called from the face DB of the connection controller and verification processing be performed on the side of each terminal.

A processing procedure up to the initiation of a videoconference according to the third embodiment will now be described using FIG. 6. Similar to the first embodiment, a case will be considered in which a request for conference initiation is made from the terminal 110.

First, a would-be participant appears in the field of view of a camera of the terminal 110. In S601, the terminal 110 uses the face detecting module 111 to detect the face of the would-be participant. Next, in S602, a feature amount of the detected face is transmitted to the connection controller 100.

In step S603, the connection controller 100 makes an inquiry to the face DB 102 regarding the facial feature and identifies a person ID. In the case of a person not having previously participated in any conference and not registered in the face DB 102, a person ID is newly created and the facial feature is newly registered in the face DB 102. In addition, transmission of the facial feature amount from the terminal 110 to the connection controller 100 is performed a plurality of times corresponding to the number of would-be participants. At this point, as a result of facial verification, would-be participant information of the terminal 110 can be obtained from the connection controller 100.

Next, upon initiating a conference, in S604, the terminal 110 makes a connection destination candidate request to the connection controller 100. In response to this request, the connection controller 100 extracts a conference having a high degree of coincidence between the would-be participants and participants of previous conferences in the same manner as in the first embodiment. Terminals other than the requesting terminal having participated in the extracted conference are listed up as connection destination candidate terminals. In S605, the list of connection destination terminals is returned. Upon receiving the list, in S606, the terminal 110 displays the list on the display and prompts a user to make a selection.

Thereafter, the processing procedure from a connection request in S607 to the initiation of audiovisual communication in S611 are the same as S310-S314, S320-S321, S330-S331 and S340-S341 in the first embodiment.

As shown, since the registration of a new member is performed automatically, the member himself/herself is not required to acquire or input an ID or a password. In addition, when a new participant joins or an existing participant leaves after the initiation of a conference, it is also possible to automatically extract facial information contained in the image, confirm the facial information at the connection controller 100, and thereby update the conference history DB 101.

Next, processing performed by the connection controller 100 according to the third embodiment will now be described using FIG. 7. While the connection controller 100 has a wide variety of functions, in FIG. 7, connection control processing through facial verification related to the third embodiment will be described.

Figure 7:
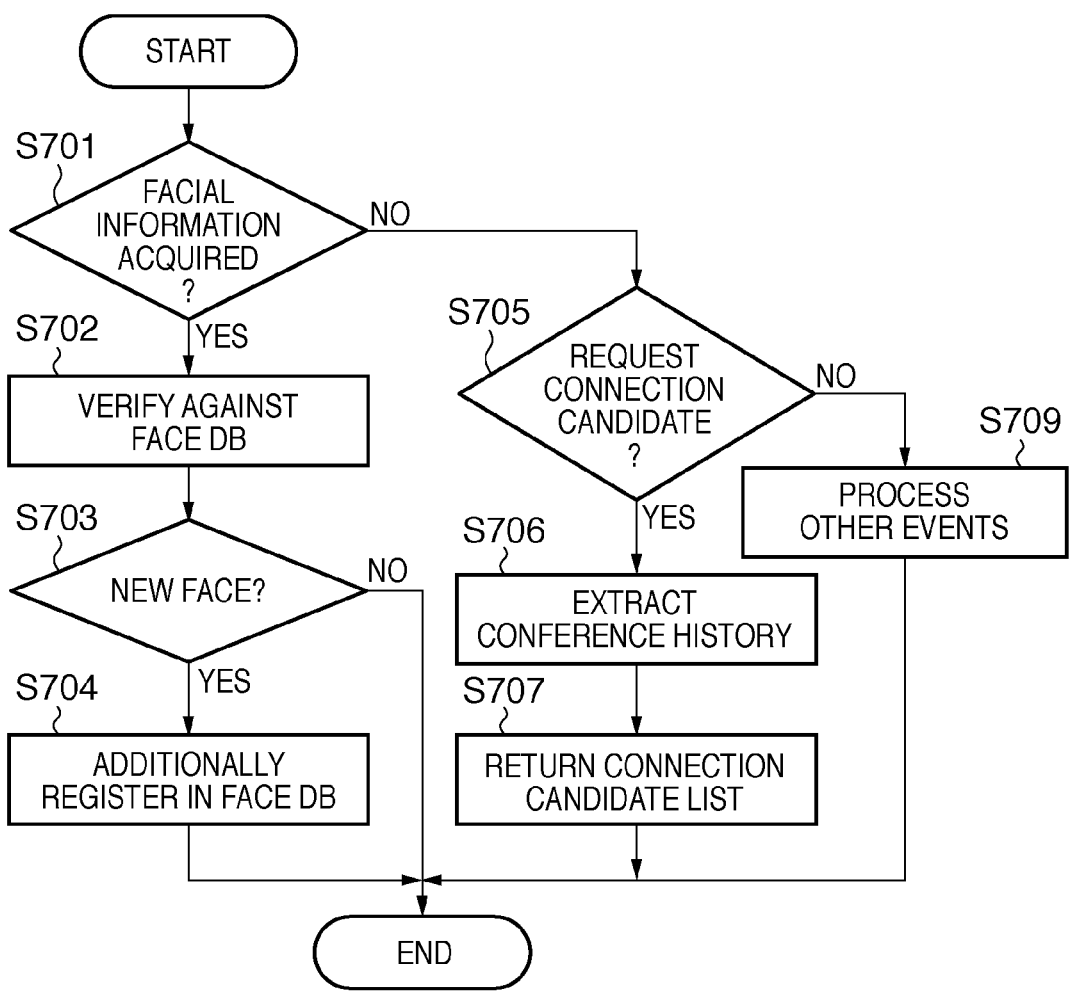
FIG. 7 is a flowchart showing processing related to facial verification according to the third embodiment.

FIG. 7 is a flowchart showing processing related to facial verification according to the third embodiment. First, in S701, a judgment is made on whether facial feature information has been acquired or not. If facial feature information has been acquired, processing proceeds to S702 to verify a face. The timing at which facial information is sent from a terminal coincides with the detection of a face of a person by a camera attached to the terminal. This timing may occur both before and after the initiation of a conference. When the timing occurs after the initiation of a conference, the person is automatically added as a conference participant.

Next, in S703, a judgment is made based on the verification result of S702 on whether the person is a new person or not. If the judgment reveals that the person is a new person, processing proceeds to S704 and newly registers the face of the person to the face DB 102. Moreover, in S703, if the face is not a face of a new person, the processing is terminated.

On the other hand, when it is revealed in S701 that facial feature information has not been acquired, processing proceeds to S705 to judge whether a request for a connection destination candidate has been made or not. At this point, if a connection destination candidate request has been made, processing proceeds to S706 to extract connection destination history. This processing is the same as the processing described in the first embodiment or, to be specific, the processing in S421 to S423. Subsequently, in S707, a list of connection destination candidates is returned to the terminal. On the other hand, when it is revealed in S705 that a connection candidate request has not been made, processing proceeds to S709 to perform processing of other events. Subsequently, the present processing is terminated.

According to the third embodiment, by providing a connection controller with a face DB in addition to a conference history DB and automatically registering would-be participants, it is no longer necessary to manually register would-be participants through a connection operation of a videoconferencing system, and a list of candidate terminals can be presented immediately. Due to such automatic registration processing, the operation load regarding conference initiation on a user of a conference terminal can be alleviated.

Fourth Embodiment

Next, a fourth embodiment of the present invention will be described in detail with reference to the drawings. For the fourth embodiment, a case will be described in which a conference history DB and a face DB are provided on the side of a conference terminal instead of the side of a connection controller. Accordingly, similar usability as the third embodiment can be provided to the user even when a connection controller does not exist.

Figure 8:
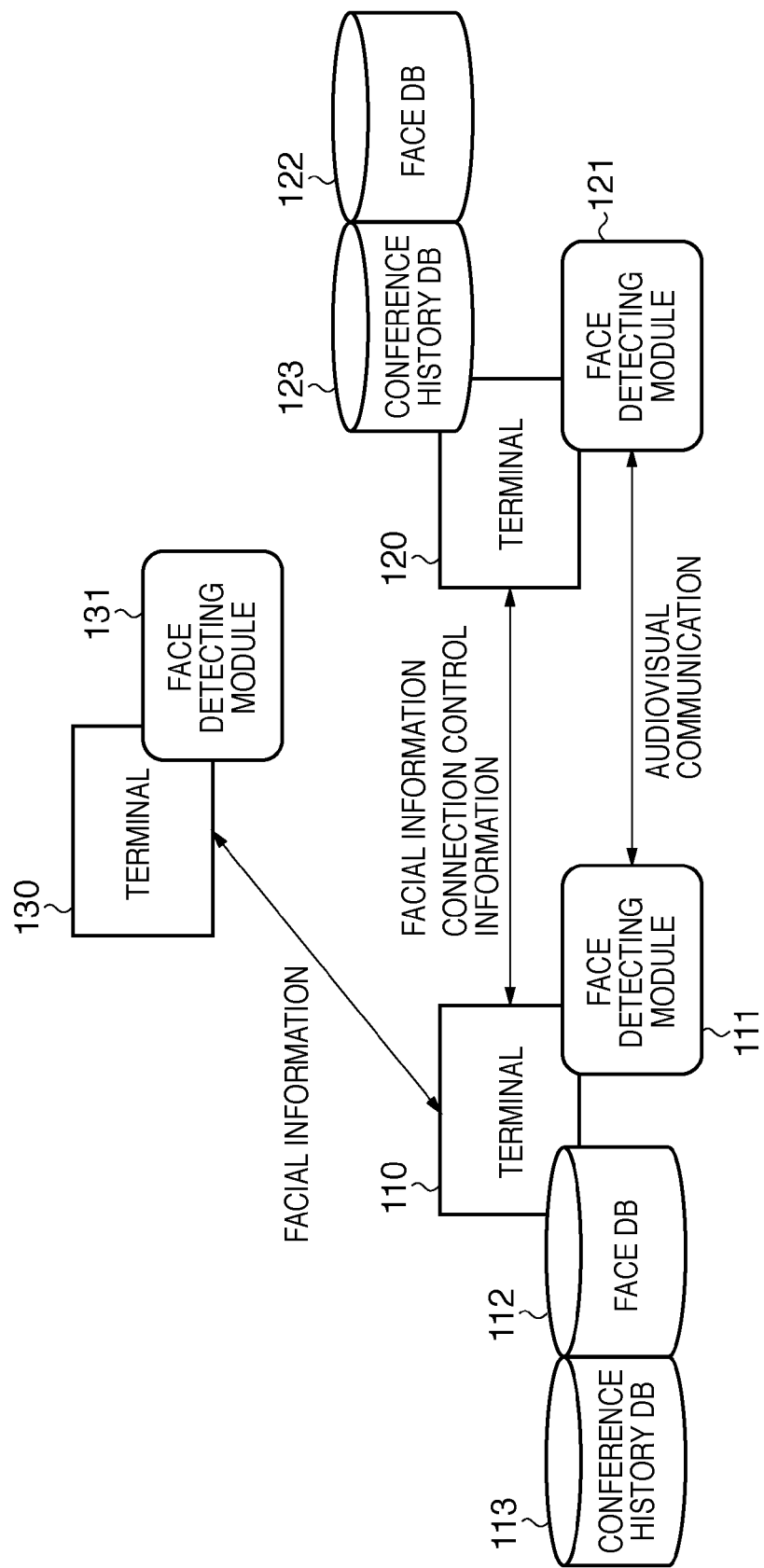
FIG. 8 is a diagram showing a configuration of a videoconferencing system according to a fourth embodiment.

FIG. 8 is a diagram showing a configuration of a videoconferencing system according to the fourth embodiment. In the system, a plurality of terminals 110, 120, and 130 is connected by a network. Moreover, in the fourth embodiment, a connection controller is not present.

The terminal 110 includes a face detecting module 111 for extracting a facial feature, a face DB 112, and a conference history DB 113. In addition, although the terminal 120 includes a face detecting module 121, a face DB 122, and a conference history DB 123 in the same manner as the terminal 110, the terminal 130 only includes a face detecting module 131. In this case, not all terminals are required to include a face DB and a conference history DB.

While a transfer model to be performed between terminals is assumed as audiovisual communication in the same manner as the first to third embodiments, video and audio may be collected at one terminal to be distributed to the other terminals. In this case, each terminal is to transmit/receive video and audio to/from a central distributing device.

In addition, a conference history DB similar to that shown in FIG. 2 may be used as the conference history DB according to the fourth embodiment. However, conference IDs and participant IDs are to be arbitrarily allocated by the respective terminals instead of being unified IDs allocated by a connection controller.

Figure 9:
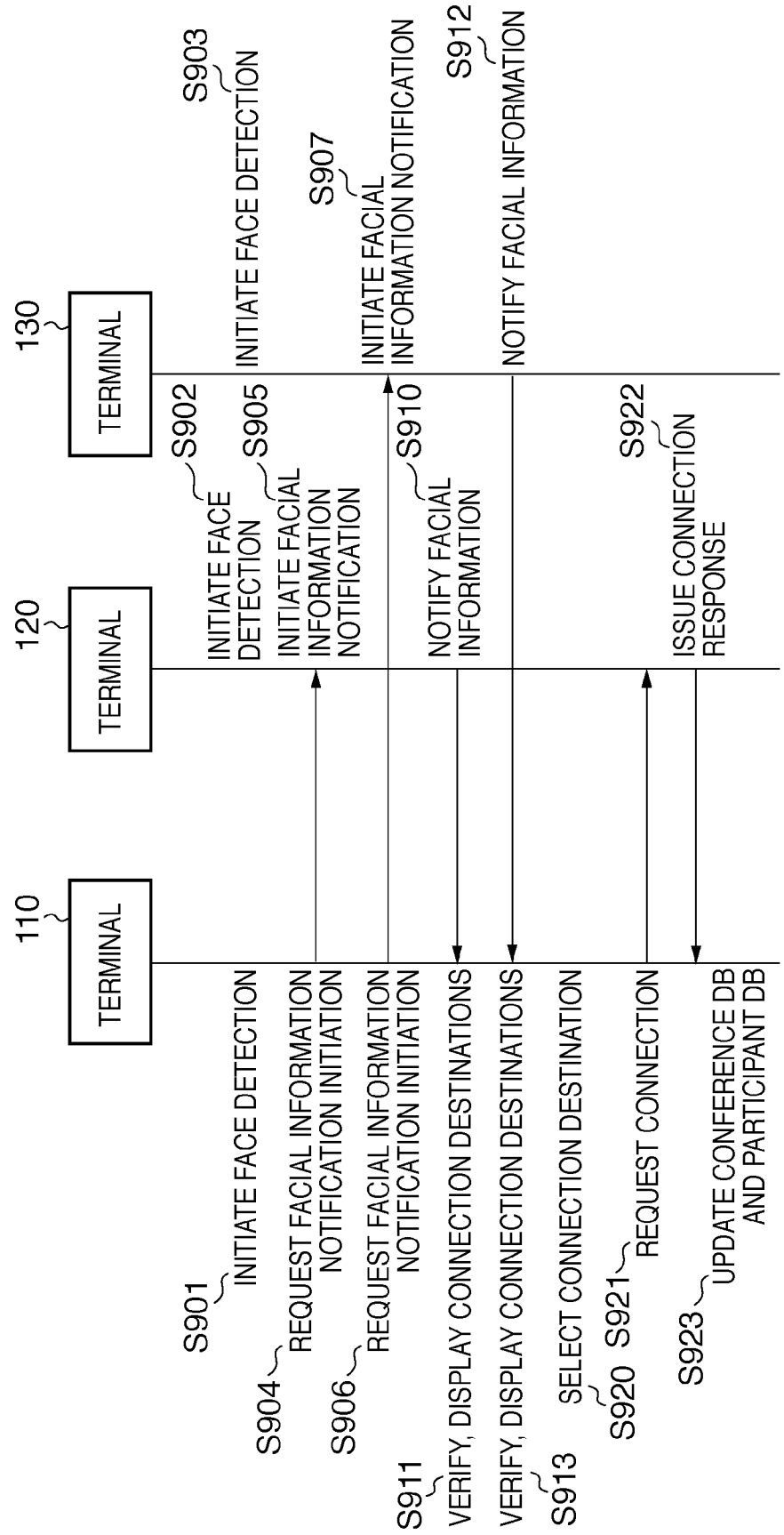
FIG. 9 is a diagram showing an inter-terminal processing procedure according to the fourth embodiment.

Next, an inter-terminal processing procedure according to the fourth embodiment will be described using FIG. 9. In this case, connection by face detection is to be performed among the terminals 110, 120, and 130. In addition, the terminals 110, 120, 130 are terminals connected by a network.

First, in S901, S902, and S903, each of the terminals commence face detection. Next, in S904 and S906, a request for face detection information is made from the terminal 110 to the terminals 120 and 130. As for a method of selecting the terminals to be requested the notification, the selection may be limited to terminals previously connected or the request may be made to all conference terminals detected on the network. In this case, it is assumed that notification initiation requests are to be made to the terminals 120 and 130.

In response to the requests, the terminal 120 accepts a facial information reception request in S905 and the terminal 130 accepts a facial information reception request in S907. At this point, if a face is detected, in S910 or S912, facial feature information is transmitted to the terminal 110.

The terminal 110 receives facial information in S911 and S913, and verifies the facial information against its own face DB 112 to identify an individual. The same verification method as the third embodiment is to be used. A verification failure at this point signifies a new individual, who is to be newly registered.

In S911 and S913, face information is received and verification is performed. At the same time, the conference history DB 113 is referenced to present a list of connection destination candidates. A method used in any one of the first to third embodiments can be used. To be specific, would-be participants are verified against participants of previous conferences. A conference with a high degree of coincidence is extracted, whereby terminals other than the requesting terminal having participated in the extracted conference are listed up as connection destination candidate terminals.

Next, when the connection destination candidates are displayed, in S920, a connection destination is selected from the displayed connection destination candidates by the user of the terminal 110, and in S921, a connection request is made. In this example, it is assumed that the connection request is to be made to the terminal 120. In response thereto, in S922, a connection admission response is made from the terminal 120. As a result, a conference session is initiated, and in S923, the conference history DB 113 and the face DB 112 of the terminal 110 are updated. Subsequently, audiovisual communication commences, for which a description will be omitted.

Moreover, when both the conference history DB 123 and the face DB 122 exist as is the case with the terminal 120, both DBs are updated upon successful connection.

Figure 10:
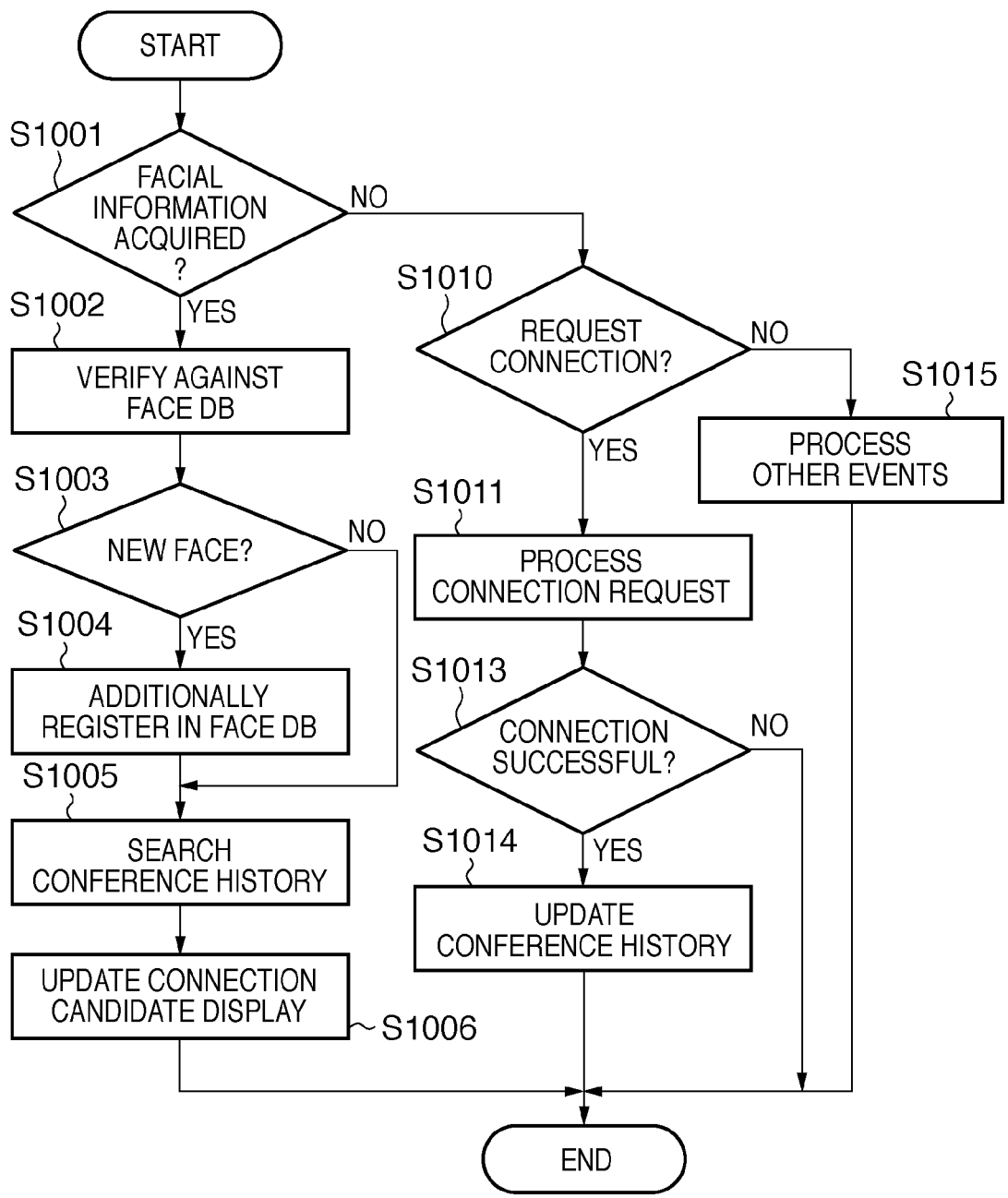
FIG. 10 is a flowchart showing a processing procedure of a terminal according to the fourth embodiment.

FIG. 10 is a flowchart showing a processing procedure of a terminal according to the fourth embodiment. For this example, a procedure of processing to be executed by the terminal 110 will be described. In addition, the following description will focus on an event processing unit that is related to connection processing through facial verification.

First, in S1001, it is confirmed that whether facial information has already been acquired by the face detecting module 111 or not. If facial feature information has been acquired, processing proceeds to S1002 to verify with the face DB 112. Next, in S1003, it is confirmed that whether verification has been successful or not. A failed verification signifies a new face, in which case processing proceeds to S1004 to additionally register the new face in the face DB 112. In addition, when verification is successful in S1003, processing proceeds as-is to S1005.

In S1005, the connection history of the conference history DB 113 is searched to determine a connection destination candidate. Subsequently, in S1006, the connection destination candidate is displayed.

On the other hand, in S1001, in the case of an event other than a facial information acquisition event, processing proceeds to S1010 to judge whether the event is a connection request or not. As a result, in the case of a connection request, processing proceeds to S1011 to perform connection request processing. The processing is call processing in which conference initiation is requested to a plurality of specified terminals. Subsequently, in S1013, a judgment is made on whether connection is successful or not. In the case of a failure, the processing is terminated. However, when successful, the processing proceeds to S1014 to update the conference history DB 113. Moreover, in the case of a failure, the present processing is terminated.

Furthermore, in S1010, when the event is not a connection request, processing proceeds to S1015 to perform processing of other events. Subsequently, the present processing is terminated.

According to the fourth embodiment, by providing a terminal with a conference history DB and a face DB, the presentation of connection destination candidates through facial verification can be performed even when a connection controller does not exist. Consequently, connection control operations can be conveniently performed with an inexpensive system configuration.

Moreover, the present invention may be applied to a system constituted by a plurality of devices (for example, a host computer, an interface device, a reader, a printer, or the like) or to an apparatus made up of a single device (for example, a copier, a facsimile, or the like).

In addition, it is needless to say that the object of the present invention can also be achieved by supplying a recording medium that records a program code of software realizing the functions of the above-described embodiments to a system or an apparatus and having a computer (a CPU or an MPU) of the system or the apparatus read out and execute the program code stored in the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-117624, filed Apr. 28, 2008, which is hereby incorporated by reference herein in its entirety.

What is claimed is:

1. A communication system comprised of a plurality of terminals and a connection controller that controls connection among the respective terminals, wherein said connection controller comprises:

a recording unit that records terminal information on terminals connected in a previous connection session and first information on participants who participated at the connected respective terminals;

a first receiving unit that receives second information on participants desiring communication, wherein the second information is transmitted from a first terminal of the plurality of terminals;

a comparing unit that compares the first information with the second information;

a selecting unit that selects connection candidate terminals, which connected to the first terminal in the previous connection session in which at least one of participants corresponding to the second information participated, from the terminal information, based on the comparing result; and a presenting unit that presents information on the connection destination candidate terminals selected by said selecting unit to the first terminal, each of said plurality of terminals comprises:

a transmitting unit that transmits the second information to said connection controller; and a second receiving unit that receives the information on the connection candidate terminals from said connection controller.

2. The system according to claim 1, further comprising a unit that records facial information of participants in a previous connection session.

3. The system according to claim 2, further comprising a unit that verifies the facial information, wherein the facial information is received from said terminals as participant information, and a participant is identified by verifying the received facial information against facial information of participants in a previous session.

4. A communication system comprised of a plurality of terminals and a connection controller that controls connection among the respective terminals, wherein
said connection controller comprises:
a recording unit that records terminals of a previous connection session and information on participants as session history information; and
a presenting unit that presents, in response to a request for a connection destination candidate from a terminal, connection destination candidate terminals to the terminal having made the request for a connection destination candidate by referencing session history information corresponding to information on participants desiring communication from said recording unit,
wherein said presenting unit verifies the participant information against participant information of a previous connection session and presents extracted results in a descending order of degrees of coincidence as the connection destination candidate terminals,
each of said plurality of terminals comprises:
a transmitting unit that transmits a connection request and participant information to said connection controller; and
a receiving unit that receives a list of the connection destination candidate terminals from said connection controller.

5. The system according to claim 4, wherein said presenting unit presents extracted results either in a descending order of the number of connections or an ascending order of the starting time or the ending time of connection as the connection destination candidate terminals when the degrees of coincidence are the same.

6. A connection controller that controls connection among a plurality of terminals, comprising:
a recording unit that records terminal information on terminals connected in a previous connection session and first information on participants who participated at the connected respective terminals;
a first receiving unit that receives second information on participants desiring communication, wherein the second information is transmitted from a first terminal of the plurality of terminals;
a comparing unit that compares the first information with the second information;
a selecting unit that selects connection candidate terminals, which connected to the first terminal in the previous connection session in which at least one of participants corresponding to the second information participated, from the terminal information, based on the comparing result; and
a presenting unit that presents information on the connection candidate terminals selected by said selecting unit.

7. A terminal comprising:
a recording unit that records terminal information on connection destination for a previous connection session and first information on participants who participated at the terminal and the connection destination;
a comparing unit that compares the first information with second information on participants desiring communication;
a selecting unit that selects connection candidate terminals, which connected to the terminal in a previous connection session in which at least one of participants corresponding to the second information participated, from terminal information, based on the comparing result; and
a presenting unit that presents information on connection candidate terminals selected by said selecting unit.

8. A control method for a communication system comprised of a plurality of terminals and a connection controller that controls connection among the respective terminals, comprising:
at said connection controller,
recording terminal information on terminals connected in a previous connection session and first information on participants who participated at the connected respective terminals;
receiving second information on participants desiring communication, wherein the second information is transmitted from a first terminal of the plurality of terminals;
comparing the first information with the second information;
selecting connection candidate terminals, which connected to the first terminal in the previous connection session in which at least one of participants corresponding to the second information participated, from the terminal information, based on the comparing result; and
presenting information on the connection candidate terminals selected in the selecting step, and
at said terminal having made the request for a connection candidate,
transmitting the second information to said connection controller; and
receiving the information on the connection candidate terminals from said connection controller.

9. A control method for a terminal that connects to a plurality of other terminals, comprising:
recording terminal information on terminals connected in a previous connection session and first information on participants who participated at the connected respective terminals as session history information in a recording unit; and
receiving second information on participants desiring communication, wherein the second information is transmitted from a first terminal of the plurality of terminals;
comparing the first information with second information;
selecting connection candidate terminals, which connected to the first terminal in the previous connection session in which at least one of participants corresponding to the second information participated, from terminal information, based on the comparing result; and
presenting information on the connection candidate terminals selected in the selecting step.

10. A non-transitory computer-readable recording medium that records a program for having a computer execute the control method according to claim 9.

11. A control method for a terminal, comprising:
recording terminal information on connection destination for a previous connection session and first information on participants who participated at the terminal and the connection destination;

comparing the first information with second information on participants desiring communication;

selecting connection candidate terminals, which connected to the terminal in a previous connection session in which at least one of participants corresponding to the second information participated, from terminal information, based on the comparing result; and presenting information on connection candidate terminals selected in the selecting step.

12. A non-transitory computer-readable recording medium that records a program for having a computer execute the control method according to claim 11.

* * * * *